United States Patent [19]
Okada

[11] Patent Number: 5,904,746
[45] Date of Patent: May 18, 1999

[54] METHOD FOR PRODUCING VITREOUS OPTICAL ELEMENTS BY INJECTION MOLDING WITH PRESSURE APPLICATION

[75] Inventor: Shin-ya Okada, Omiya, Japan

[73] Assignee: Fuji Photo Optical Co., Ltd., Omiya, Japan

[21] Appl. No.: 08/935,136

[22] Filed: Sep. 22, 1997

[30] Foreign Application Priority Data

Sep. 24, 1996 [JP] Japan ................................. 8-271295

[51] Int. Cl.⁶ ........................................... C03B 11/00
[52] U.S. Cl. .................... 65/66; 65/37; 65/39; 65/45; 65/47; 65/63; 65/64; 65/83; 65/122; 65/124; 65/126; 65/209; 65/213; 65/215; 65/221; 65/223; 65/226; 425/808
[58] Field of Search ......................... 65/37, 39, 45, 65/47, 63, 64, 66, 83, 122, 124, 126, 209, 213, 215, 221, 223, 226; 425/808, 542

[56] References Cited

U.S. PATENT DOCUMENTS

| | | | |
|---|---|---|---|
| 1,902,140 | 3/1933 | Rowe | 65/124 |
| 4,199,343 | 4/1980 | Eolin et al. | 65/223 |
| 5,540,746 | 7/1996 | Sasaki et al. | 65/122 |

FOREIGN PATENT DOCUMENTS

| | | | |
|---|---|---|---|
| 536633 | 4/1993 | European Pat. Off. | 65/37 |
| 3306253 | 9/1983 | Germany | 65/66 |
| 57-605 | 1/1982 | Japan | 65/37 |
| 62-230633 | 10/1987 | Japan | 65/66 |
| 5-279055 | 10/1993 | Japan | 65/37 |

*Primary Examiner*—Peter Chin
*Assistant Examiner*—Michael P. Colaianni
*Attorney, Agent, or Firm*—Oblon, Spivak, McClelland, Maier & Neustadt, P.C.

[57] ABSTRACT

Method and apparatus for producing vitreous optical elements by injection molding, which essentially includes the stages of: melting down a glass material into a molten state in a viscosity at or lower than a working point of the glass material; injecting molten glass under pressure into a mold cavity defined between transfer surfaces of relatively movable mold members of a mold assembly unit in communication with a sprue connecting the mold cavity with an injection port on the outer side of the mold assembly unit; and applying a predetermined pressure on the glass material in the mold cavity while cooling the mold assembly unit down to a temperature in the vicinity of yielding point of the glass material.

4 Claims, 6 Drawing Sheets

5,904,746

METHOD FOR PRODUCING VITREOUS OPTICAL ELEMENTS BY INJECTION MOLDING WITH PRESSURE APPLICATION

BACKGROUND OF THE INVENTION

1. Field of the Art

This invention relates to a method and an apparatus for producing vitreous optical elements by infection molding, i.e., by introducing heated molten -glass into a mold cavity having transfer surfaces to be copied onto glass moldings.

2. Prior Art

In the manufacture of precision optics like optical glass lenses, it has long been the conventional practice to resort to a grinding and polishing process. However, the conventional grinding and polishing processes have a number of drawbacks such as low production efficiency, difficulty of producing aspheric lenses etc. As a substitute for the conventional grinding and polishing process, it has also been known in the art to produce optical elements by compression molding using preformed glass of a predetermined shape, i.e., by heating and softening a preform of glass and compressing same to shape within a die. Further, developments have been made for injection molding processes in regard to the production of optical elements of the class as mentioned above. Of these molding processes, the compression molding process requires to prepare a large number of preforms beforehand, while the injection molding process which is free of problems of this sort is superior in terms of production efficiency.

In an injection molding process, glass material is heated to lower its viscosity to a working point, and resulting molten glass of low viscosity is injected into a mold under a predetermined pressure to mold a vitreous optical element having contours defined by a mold cavity. In addition to the mold cavity with transfer surfaces, a mold assembly unit for use in injection molding is normally provided with a sprue in communication with the cavity for introduction of molten glass into the latter. At one end, the sprue is opened into the mold cavity, and, at the other end, opened on the outer periphery of a shell block of the mold assembly. Heated molten glass, maintained in a fluidized state by reduction in viscosity, is injected into the sprue under a predetermined pressure to fill in the mold cavity completely.

Subsequent to injection of molten glass into the mold cavity, the whole mold assembly unit is cooled down to let glass solidify to the shape of the mold cavity, copying the contours defined by mold cavity walls. Accordingly, a molded optical element of predetermined shape or contours is obtained upon ejecting the molded product from the mold and cutting off surplus glass from the sprue.

The temperature of glass working point, at which glass has suitable viscosity in injection molding, is normally higher than 600° C. depending upon the properties of the glass material concerned, and at least higher than 550° C. even in a case where glass material of particular properties is selected. Namely, prior to introduction into a mold, glass material is heated into a molten state having a temperature in the vicinity of or higher than the glass working point, and then cooled down for solidification of glass which initially takes place at a transformation temperature in the range of from 450° C. to 400° C. Glass stays in a fluidized state until the transformation temperature, and undergoes thermal contractions on further temperature drops. The thermal contractions of this sort gives rise to the problems of surface sink or shrink marks which occur to the surfaces of solidified glass within the mold as a result of thermal contraction, making it difficult to obtain products of high precision quality surface contour.

SUMMARY OF THE INVENTION

With the foregoing situations in view, it is an object of the present invention to provide a method and an apparatus for precision injection molding of vitreous optical elements with high surface accuracy, free of sink or shrink marks which would normally occur to the surfaces of glass moldings in a cooling stage.

It is another object of the present invention to provide a method and an apparatus for injection molding of the class as mentioned above, which can produce high precision optics continuously in an efficient manner.

In accordance with the present invention, the above-stated objectives are achieved by the provision of an apparatus for injection-molding vitreous optical elements, which comprises: a mold assembly unit including upper and lower mold members relatively movable toward and away from each other and having transfer surfaces facing opposingly to each other across a mold cavity, and a sprue provided internally of the mold assembly unit to communicate the mold cavity with an injection port on the outer side of the mold assembly unit; a glass injection means for injecting glass material into the mold cavity under pressure in a molten state in a viscosity in the vicinity of a working point of the glass material; and a mold pressing means for applying a pressure on the glass material in the mold cavity in a stage subsequent to injection of the glass material into the mold cavity.

The glass injection means is provided in an injection stage, while the mold pressing means is provided in a subsequent pressing stage which is under temperature control to maintain the injected glass material in a viscosity in the vicinity of yielding point thereof. The mold assembly unit is transferred from the injection stage to the pressing stage where a pressure is applied on the mold assembly unit to correct the shape of the injected glass material while it is in the vicinity of a yielding point, that is to say, while it is still in a deformable state in viscosity. The mold assembly unit can be constituted, for example, by a movable mold member and a fixed mold member which are disposed opposingly to each other. The mold cavity which is defined between the movable and fixed mold members, and the sprue is preferably opened into the mold cavity at least at a lateral side of the movable or fixed mold member. A pressure can be applied on the movable mold member in the pressing stage by the use of a pressing mechanism or by putting a weight member on the movable mold member or by imposing the weight of the movable mold member itself on the glass material in the mold cavity by gravity.

For precluding sink marks by the pressing operation, it suffices to push in the movable mold member by an extremely small distance in the order of several μm to several tens μm. Accordingly, it is also possible to set the movable and fixed mold member apart by a small gap space of several tens μm at the time of glass injection. The existence of a fine gap space of this order between the movable and fixed mold members is would not lead to leaks of molten glass therethrough, but rather helps extracting air in the mold cavity therethrough. In the pressing stage, the fine gap space between the movable and fixed mold members determines the pressing stroke against the glass material in the mold cavity.

When a pressure is applied by a pressing means, the glass material in the mold cavity is still in a molten state.

Therefore, for the purpose of preventing fluid glass in the mold cavity and sprue from spilling out into the sprue under pressed conditions, it is desirable to provide, in the injection stage or in the pressing stage, a gate seal or gate cut means which can close the gate to the mold cavity.

The above-mentioned glass injection means can be constituted by a crucible which can hold glass material in a predetermined molten state, and a forced feed means for sending molten glass toward an injection nozzle under pressure. Alternatively, the glass injection means may be constituted by an injection cartridge which is provided with a cylinder chamber to accommodate a glass rod, an injection nozzle which is formed at a fore end portion of the cylinder chamber, and a pressure means which is provided at a rear end portion of the cylinder chamber for pushing the glass rod toward the injection nozzle, and a heater arranged to heat at least the injection nozzle of the cartridge up to a working temperature of the glass material to melt down fore end portions of the glass rod. Molten glass, melted down from fore end portions of the glass rod, is fed to the injection nozzle under pressure as a solid base end portion of the glass rod is pushed forward by the pressure means. For the purpose of improving the throughput of a molding process, a plural number of injection cartridges may be provided in the injection stage to inject molten glass simultaneously into a plural number of mold assembly units. In such a case, glass rods of different optical properties may be loaded in the injection cartridges to produce optical elements of different types simultaneously.

According to the present invention, there is also provided a method for producing vitreous optical elements by injection molding, which is characterized by: a melting stage for melting down a glass material into a molten state in a viscosity at or lower than a working point of the glass material; an injection stage for injecting molten glass under pressure into a mold cavity defined between transfer surfaces of relatively movable mold members of a mold assembly unit in communication with a sprue connecting the mold cavity with an injection port on the outer side of the mold assembly unit; and a pressing stage for applying a predetermined pressure on the glass material in the mold cavity while cooling the mold assembly unit down to a temperature in the vicinity of an yielding point of the glass material.

In the injection stage, the molten glass material is preferred to have a viscosity in the range of $10^2$ to $10^3$ poise and, in the pressing stage, to have a viscosity in the range of $10^{10}$ to $10^{12}$ poise. The load to be applied in the pressing stage is desirably in the range of from 100 gf/cm$^2$ to 150 kgf/cm$^2$. Further, subsequent to the pressing stage, the mold assembly unit is preferably put in a slow cooling stage, cooling down the glass material to a viscosity in the range of from $10^{14}$ to $10^{18}$ higher than a strain point of said glass material, for the purpose of precluding residual strains.

BRIEF DESCRIPTION OF THE DRAWINGS

The above and other objects, features and advantages of the present invention will become apparent from the following particular description of the inventions taken in conjunction with the accompanying drawings which show some preferred embodiments of the invention solely by way of example and in which.

DESCRIPTION OF PREFERRED EMBODIMENTS

Hereafter, the invention is described more particularly by way of its preferred embodiments with reference to the accompanying drawings.

Figure 1:
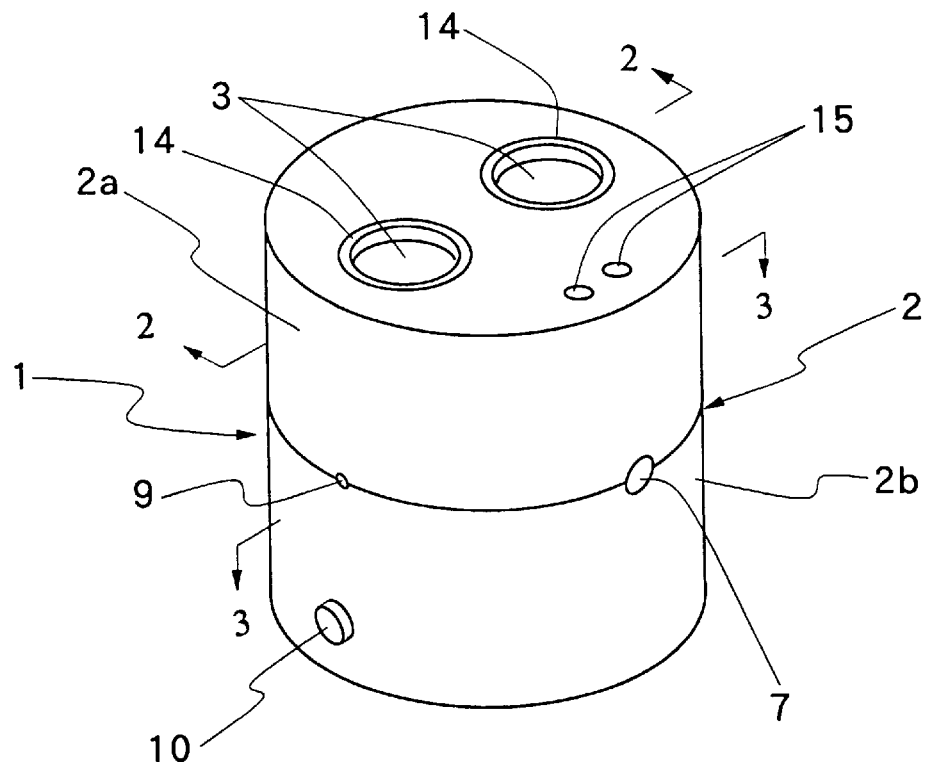
FIG. 1 is a schematic perspective view of a mold assembly unit suitable for use in injection molding of vitreous optical elements according to the invention.
Figure 2:
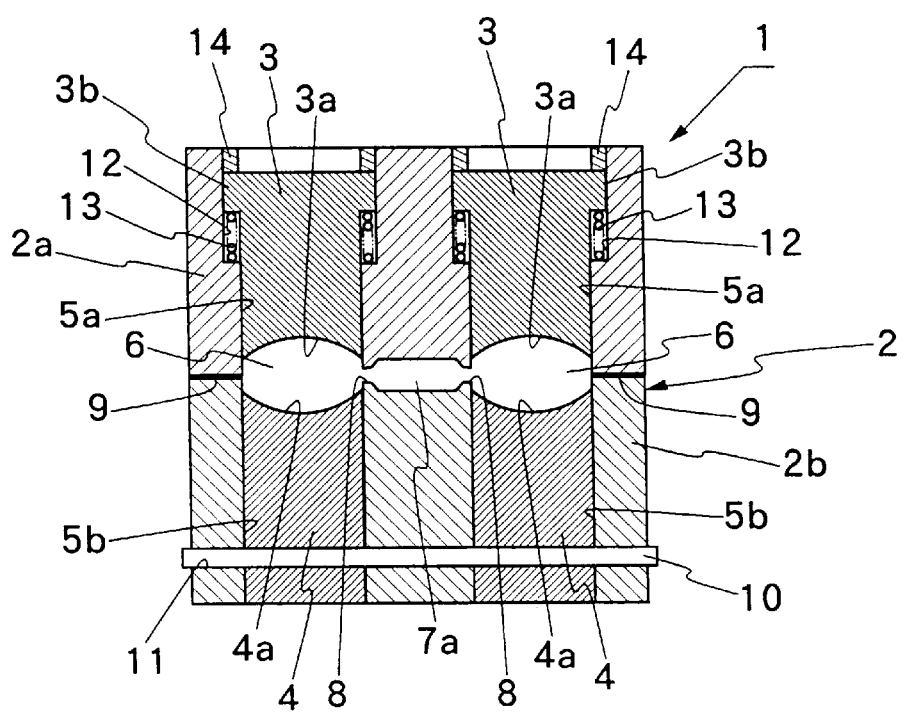
FIG. 2 is a schematic sectional view, taken on line X—X of FIG. 1.
Figure 3:
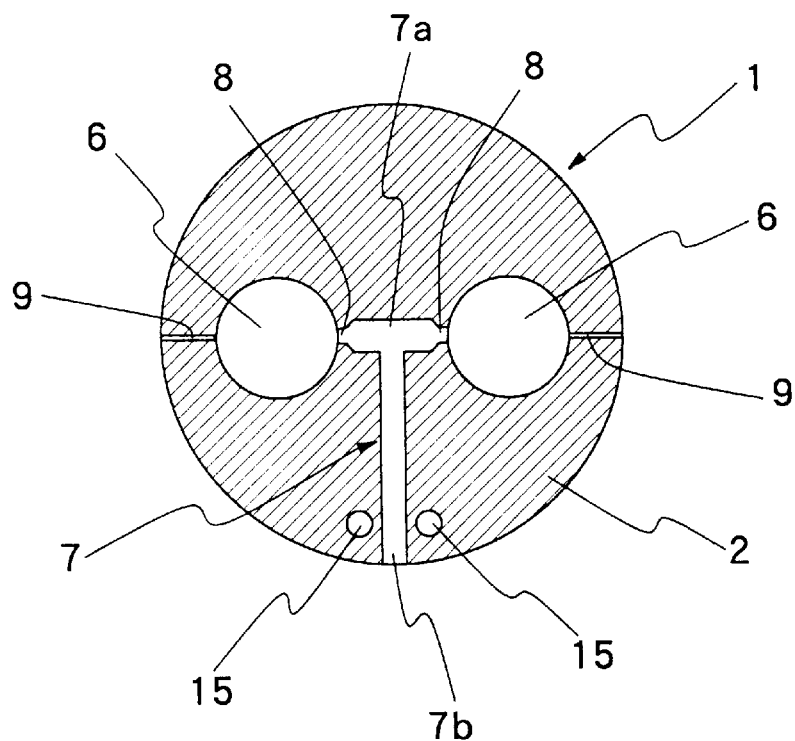
FIG. 3 is a schematic sectional views taken on line Y—Y of FIG. 1.

Referring first to FIGS. 1 to 3, there is shown an exemplary construction of a mold assembly unit suitable for use in glass injection molding according to the present invention. The mold assembly unit of this particular example is arranged to produce simultaneously a couple of optical glass lenses. However, it is to be understood that, as clear from the following description, the mold assembly unit can be arranged to mold simultaneously a greater number of optical lenses or other different types of optical elements.

In FIGS. 1 to 3, indicated at 1 is a mold assembly unit which is constituted by a split shell block 2, and a pair of mold sets each consisting of upper and lower mold members 3 and 4. The split shell block 2 is comprised of upper and lower shells 2a and 2b. Bored vertically through the upper and lower shells 2a and 2b are shafts 5a and 5b in two radially spaced positions to accommodates two sets of molds each consisting of upper and lower mold members 3 and 4 as mentioned above. The upper and lower mold members 3 and 4 of each mold set are so positioned in the vertical shafts 5a and 5b as to define therebetween a cavity 6 of a predetermined shape, including transfer surfaces 3a and 4a of predetermined curvature or contour which are provided on the lower and upper end faces of the upper and lower mold members 3 and 4, respectively.

Formed on the joint faces of the upper and lower shell blocks 2a and 2b is a passage 7a which is formed between the two mold sets to intercommunicate the respective cavities 6, and a sprue 7b which is extended from an intermediate portion of the passage 7a to an opening on the circumference of the shell block 2. The passage 7a is opened into the respective cavities 6 through a gate 8 with a constricted passage area. Further, the cavity 6 of each mold set is communicated with an extremely narrow gassing passage 9 at a position radially opposing the gate 8.

The lower molds 4 of the respective mold sets are fixed in position within the shafts 5b of the lower shell 2b by means of a lower mold lock pin 10. This lock pin 10 is inserted in a radial locking hole 11 which is bored through the lower shell 2b and lower mold members 4 in a direction perpendicular to the axes of these lower mold components. Accordingly, upon extracting the lock pin 10 out of the radial locking hole 11, the lower mold members 4 are freed for vertical movements within the shafts 5b. At the time of injection molding, the lower mold members 4 are locked in position within the shafts 5b to serve as fixed mold halves. On the other hand, the upper mold members 3, fitted in the upper shell 2a, serve as movable mold halves which are movable up and down within the shafts 5a.

At the time of injection molding, the upper mold member 3 is retained at a predetermined level within the upper shell 2a to define a cavity 6 of an appropriate shape in cooperation with the lower mold 4. Besides, after injection of glass material, the upper mold member 3 is pushed into the upper shell 2a by a mold pressing means acting over a limited pressing stroke. In order to press the upper mold member 3 over a delimited stroke range, the shaft 5a of the upper shell block 2a is radially broadened to form a larger diameter portion over a predetermined length from its upper end to receive a flange portion 3b which is provided at the upper end of the upper mold member 3. By a biasing spring 13, which is fitted in a spring chamber 12 between a stepped wall at the inner end of the broadened upper end portion of the shaft 5a and the flange 3b, the upper mold member 3 is normally urged into abutting engagement with a stopper ring 14 which is fixedly fitted in an upper end portion of the shaft 5a and which has an inside diameter smaller than the outside diameter of the flange 3b of the upper mold member 3. Accordingly, the upper mold member is constantly biased in an upward or outward direction unless it is pushed in by applying an external force against the action of the biasing spring 13.

Further, bored vertically through the shell block 2 are cooling passages 15 on the opposite sides of and in the vicinity of the outer end of the sprue 7 which is opened on the circumference of the shell block 20 In a cooling stage subsequent to a glass injection stage, a cooling medium such as low temperature nitrogen gas or the like is circulated through these cooling passages 15 for rapidly solidifying molten glass at and in the vicinity of the outer open end of the sprue 7.

Figure 4:
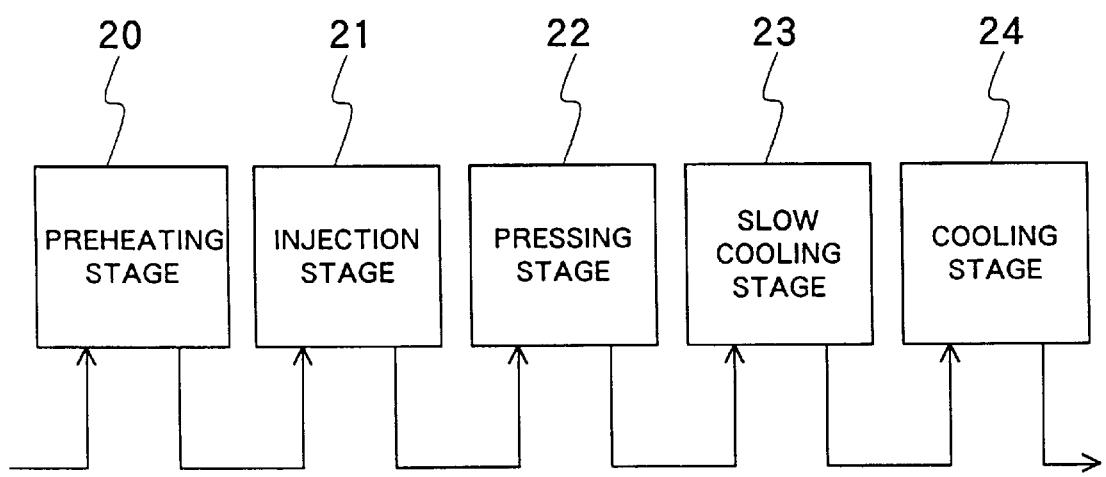
FIG. 4 is a block diagram of various stages in an injection molding process according to the invention.

In a process for injection-molding optical elements, the mold assembly unit 1, with the arrangements as described above, is successively transferred to and from the respective stages as shown in FIG. 4. The injection molding process of FIG. 4 includes a mold preheating stage 20, a glass injection stage 21, a mold pressing stage 22, a slow cooling stage 23, and a cooling stage 24.

By heating the mold assembly unit 1 in the mold preheating stage 20 prior to injection of molten glass, the glass material which has been heated to molten state is prevented from picking up viscosity by cooling before introduction into the mold cavities 6 through the sprue 7 and the respective gates 7. For this purpose, a heater is provided in the mold preheating stage 20 for heating the mold assembly unit preferably to a temperature of a working point for injection molding of glass material or to a temperature in the vicinity of its softening point.

Nextly, molten glass is introduced into the mold cavities 6 in the injecting stage 21. An injection cartridge 30, as shown in FIG. 5, is provided in this injecting stage 21 for injection of molten glass into the mold cavities 6.

Figure 5:
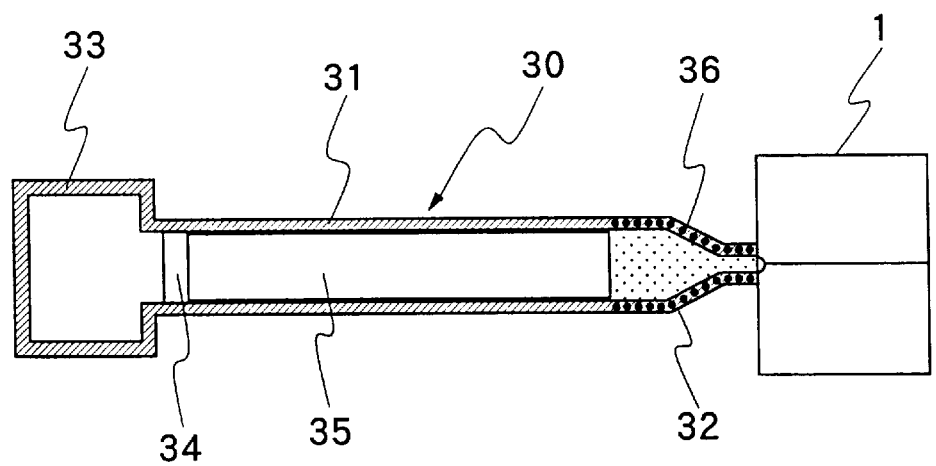
FIG. 5 is a schematic sectional view of an injection cartridge.

More particularly, the injection cartridge 30 of FIG. 5 includes a cylinder chamber 31, an injection nozzle 32 which is provided at the fore end of the cylinder chamber 31, and a fluid-pressure chamber 33 which is provided at the base or rear end of the cylinder chamber 31. The cylinder chamber 31 is in the form of an elongated tube to accommodate a glass rod 35 on the front side of a piston 34 which is slidable in the axial direction within the cylinder chamber 31. A heater 36 is provided around the injection nozzle 32 and fore end. portions of the cylinder chamber 31 to melt down fore end portions of the glass rod 35 into a predetermined molten state. In this instance, the term "molten state" means a fluidized state in which glass can be smoothly injected into a mold from the injection nozzle 32 by application of a predetermined pressure, or a viscosity of glass working point, more specifically, a viscosity in the range of from $10^2$ to $10^5$ poise, preferably in the range of from $10^3$ to $10^4$ poise.

As soon as the mold assembly unit 1 is sent to and set in the injecting stage 21, the injection nozzle 32 of the cartridge 30 is connected to the sprue 7 by way of an injection port which is opened on the circumference of the shell block 2. Then, a fluid pressure is introduced into the pressure chamber 33, pushing forward the base end of the glass rod 35 with the piston 34 to extrude the glass rod 35 out of the cartridge 30. Since the glass rod 35 is heated and kept in molten state in its fore end portions by the heater 36 which is wrapped around the injection nozzle and fore end portions of the cylinder chamber 31, molten glass is introduced into the cavities 6 of the mold assembly unit 1 through the sprue 7 under the pressure applied by the piston 34. In or prior to this glass injection stage, the mold assembly unit 1 is fixed in a clamped state by a mold clamp means which is not shown.

Further, in the pressing stage 22, the molten glass, which was injected into the mold cavities 6 in the preceding injecting stage 21, is cooled down to a viscosity in the vicinity of a yield point of the glass material while at the same time a pressure is applied on the upper mold members 3 from above to ensure that the transfer surfaces 3a and 4a on the upper and lower mold members 3 and 4 are correctly copied on the molded products, while at the same time precluding occurrence of sink or shrink marks which would otherwise come out on the surfaces of the molded glass material as a result of thermal contraction on temperature drops. More particularly, for this purpose, a mold pressing means 40 is provided in the pressing stage 22. The mold pressing means 40 is constituted by a lift cylinder 41 and a weight 43 which is loosely supported on arms 42 at the lower end of the lift cylinder rod for movements toward and away from the mold assembly unit 1. In the particular embodiment shown, the weight 43 is provided with a couple of pressing lands 43a face to face with the upper mold members 3 in the shell block 2 of the mold assembly unit 1.

Figure 6:
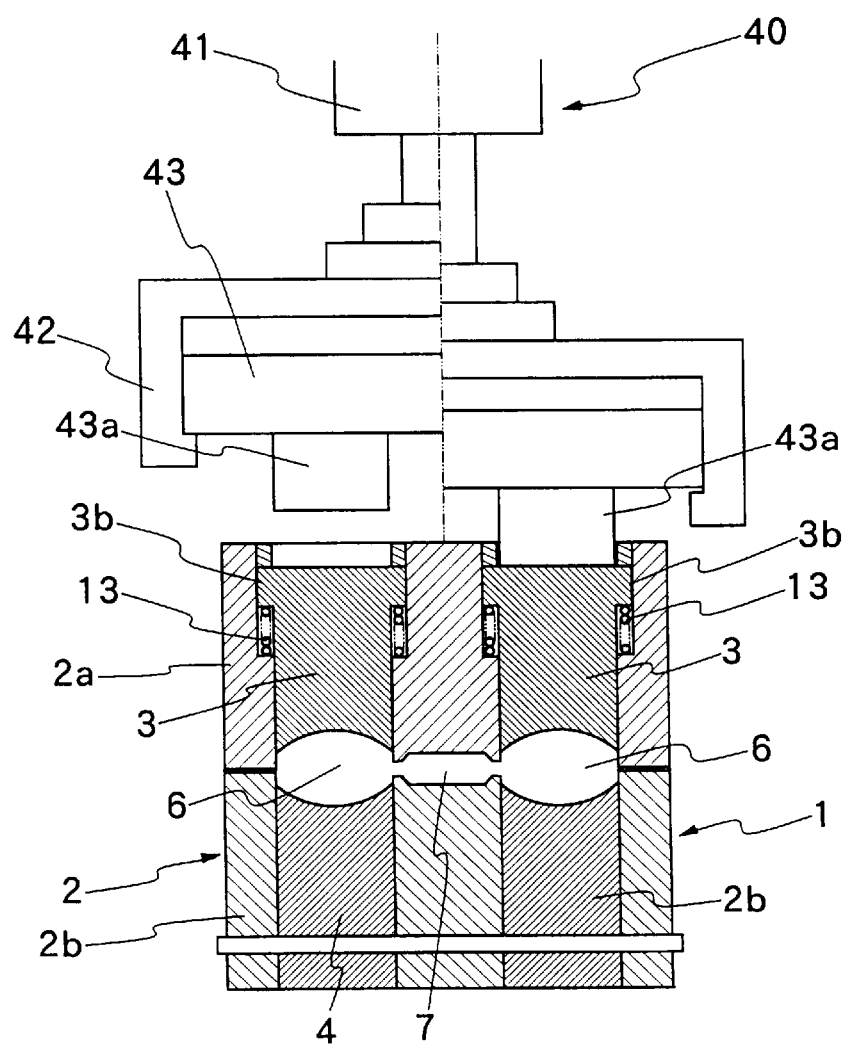
FIG. 6 is a schematic illustration of a mold pressing means.

In the pressing stage, the weight 43 is applied on the upper mold member 3a to press the glass material which is still in a viscosity in the vicinity of yielding point. As the weight 43 is applied on the upper mold member 3 by the mold pressing means, the weight 43 is pushed down against the action of the spring 13. In this regard, FIG. 6 shows in its left half the weight 43 which is located away from the upper mold member 3 and in its right half the weight 43 which is pressed against the upper mold member 3. Nevertheless, in case the injected glass material has a relatively high viscosity or when molding a large optical lens, the application of the weight 43 alone could be insufficient in removing shrink marks from the surfaces of moldings. In such a case, there may be provided a hydraulic cylinder or other press means for pressing the weight 43 against the upper mold members 3 in a more positive manners, or an additional weight may be put on the weight 43.

The viscosity of the yielding point at which glass is maintained in the pressing stage 22 is slightly lower than the viscosity at the transformation temperature. Generally, glass has a viscosity of approximately $10^{12}$ poise at the transformation temperature where solidification of glass initially takes place. Namely, at the transformation temperature, it is difficult to remove shrink marks on the surfaces of glass moldings Therefore, the temperature should be controlled strictly to maintain a viscosity slightly lower than the viscosity at the transformation temperature, that is to say, to maintain a viscosity of $10^{10}$ to $10^{12}$ poise.

Further, in the slow cooling stage 23 following the above-described pressing stage 22, the glass material in the mold cavities is gradually cooled off further from the yielding point to a temperature level in the vicinity of strain point. The viscosity at the strain point is normally $10^{14}$ to $10^{18}$ poise, so that strains will occur to the glass if its temperature is dropped rapidly toward that viscosity. In order to cool down the glass material slowly toward a viscosity of $10^{14}$ to $10^{18}$ poise, the mold is maintained under strain point temperature conditions in the slow cooling stage 23. While glass is being cooled down to the strain point in the slow cooling stage 23, a slight degree of surface shrink may occur to the glass moldings. In order to preclude possibilities of surface shrinks in this stage, the weight 43 may be continually applied on the upper mold members 3 in the slow cooling stage or alternatively a different weight may be applied on the mold while in the slow cooling stage.

Following the slow cooling to the strain point in the slow cooling stage 23, glass moldings are further cooled down in the final cooling stage 24 until they reach a state of complete solidification, ready for ejection from the mold.

The above-described injection molding apparatus according to the present invention is particularly suitable for use in molding vitreous optical elements by a method as described below.

In the first place, the mold assembly unit 1, in a clamped and fixed state, is transferred to the preheating stage 1, where the whole mold assembly unit 1 is heated to a temperature in the vicinity of softening point. The heated mold assembly unit 1 is then transferred to the glass injection stage 21, followed by connection of the injection port on the circumference of the shell block 2 with the injection nozzle 32 of the glass injection cartridge 30, with fore end portions of the glass rod 35 heated into molten state by the heater 36. In this state, molten glass is pushed forward by a fluid pressure prevailing in the pressure chamber 33 and injected into the mold cavities 6 under pressure through the sprue 7. At this time, air in the mold cavities 6 is evacuated to the outside through the gassing passage 9, so that the molten glass, which has been heated to a temperature as high as glass working point, can be introduced to fill in the whole mold cavities 6 smoothly free of bubbling.

As soon as the mold cavities 6 are entirely filled with molten glass, the mold assembly unit 1 is separated from the injection cartridge 30 for transfer to the pressing stage 22. Before or after separating the mold assembly unit 1 from the injection cartridge 30, nitrogen gas of relatively low temperature is supplied to the coolant passage 15, whereupon the sprue 7 is sealed with solidified glass to preclude the possibilities of inverse flow of molten glass from the mold cavities 6 to the sprue 7.

The mold assembly unit 1, which holds injected glass still in a state of low viscosity within the cavities 6, is then transferred to the pressing stage. As soon as the mold assembly unit 1 is set in position in the pressing stage, the cylinder 41 is lowered from an upper standby position, pressing the upper mold members 3 with the pressing lands 43a of the weight 43 to apply a pressure on the glass material in the mold cavities 6. In this pressing stage 22, the temperature is adjusted to and maintained at a level in the vicinity of the yielding point in viscosity, allowing the glass material to cool off to that temperature level. Besides, despite the thermal contraction which occurs to the fluidized glass material upon cooling, high precision surface contours can be produced by removal of shrink marks under the pressure which is applied by the weight 43. In this regard, preferably the weight 43 is arranged to impose a load in the range of 100 $gf/cm^2$ to 150 $kgf/cm^2$ in pressing the mold. Further, the application of a pressure will not induce reverse flow of glass from the mold cavities 6 to the sprue 7 because the solidified glass in the sprue 7 acts as a plug or stopper as described hereinbefore.

In this manner, in the pressing stage, simultaneously with the removal of sink or shrink marks, the injected glass material is cooled down to a viscosity in the vicinity of its yielding point, that is to say, cooled down to a temperature level at which solidification of glass substantially initiates or at which solidification of glass is about to take place. Then, the mold assembly unit 1 is transferred to the slow cooling stage 23 to cool down the glass material gradually to a temperature below the strain point. In the course of the slow cooling, preferably the mold assembly unit 1 is continuously kept in the pressed state by the use of the weight 43 from the preceding pressing stage 22 or by applying a weight which is provided exclusively for use in the slow cooling stage 23. By so doings the glass material is gradually cooled down in a restricted state under the load of the weight 43, free of deformations which would otherwise occur to the glass moldings in the course of slow cooling Consequently, it becomes possible to preclude developments of residual strains in the glass, and to produce glass moldings having surface contours of extremely high accuracy.

Once the viscosity is increased beyond the strain point, the glass moldings can be cooled quickly without producing any adverse effects in particular. Therefore, from the slowing cooling stage 23, the mold assembly unit 1 is transferred to the cooling stage 24 to cool down the mold assembly unit as quickly to an ejection temperature as possible. Upon discharge from the cooling state 24, the mold assembly unit 1 is opened to eject the molded optical elements. At this stage, surplus glass portions from the gates 8 and sprue 7, which are connected to the ejected optical elements, are cut off at gate portions 8 by the so-called gate cutting.

Optical glass elements can be molded in an extremely efficient manner by processing glass material in a number of similar mold assembly units 1 successively and concurrently through the preheating stage 20, injecting stage 21, pressing stage 22, slow cooling stage 23 and cooling stage 24 which are maintained in different temperature conditions independently of each other for the specific treatments as described above.

Figure 7:
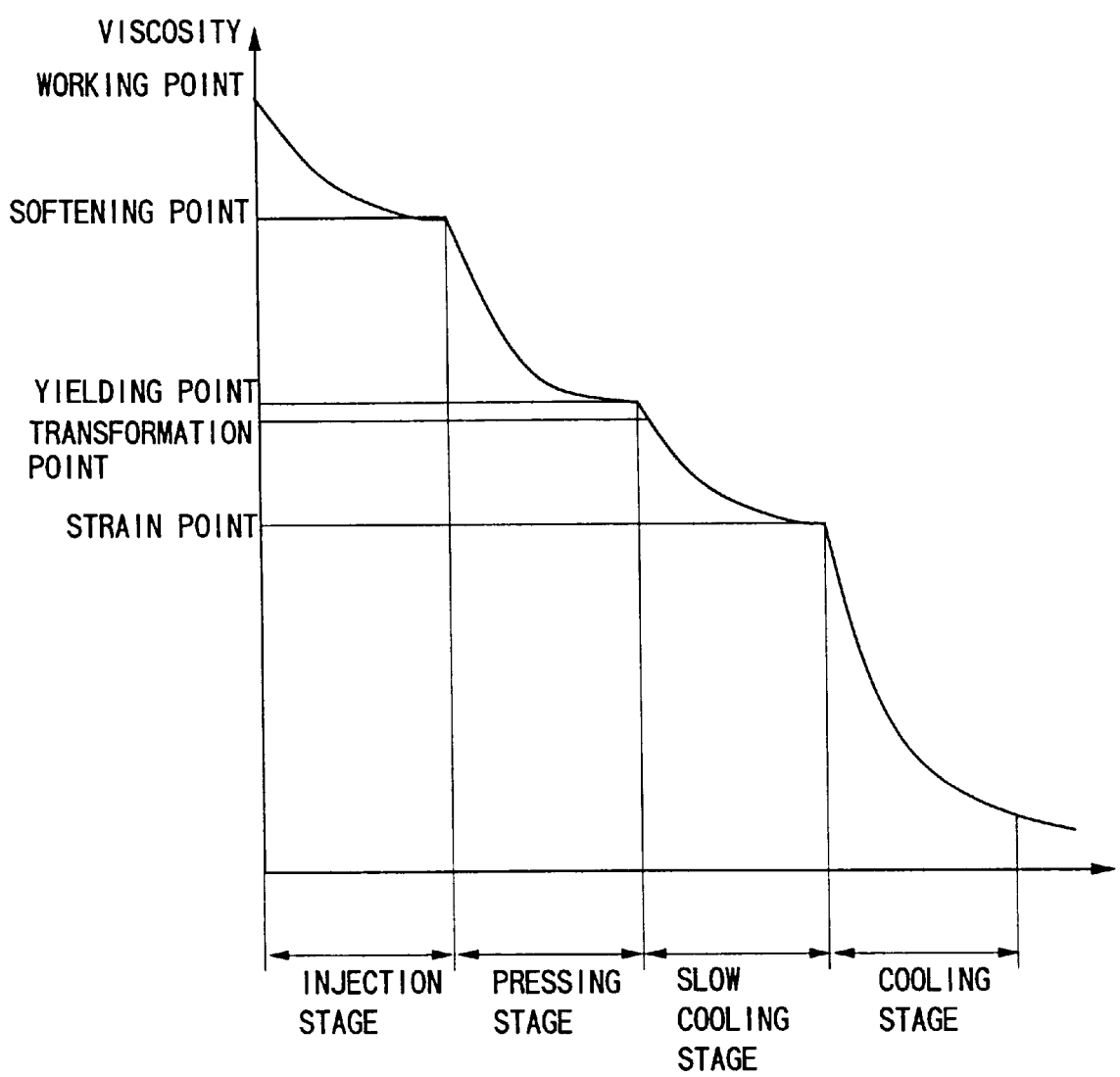
FIG. 7 is a diagram explanatory of changes in glass viscosity in various stages of an injection molding process.

Especially, as clear from FIG. 7 which shows the glass viscosity in the respective stages of the molding process, the glass material which has been introduced into the mold assembly unit 1 is pressed in the pressing stage 22 while in a viscosity in the vicinity of yielding point to ensure high precision transfer of surface contours to glass moldings, at the same time removing shrink marks to attain conspicuously improved surface accuracy. In the succeeding slow cooling stage 23, the glass is gradually cooled down to a viscosity of strain point thereby preventing developments of internal strains in an assured manner. As a consequence, there can be obtained quality optical elements which are extremely accurate in surface contour and exempted from residual strains.

In each of the glass injection stage 21, mold pressing stage 22 and slow cooling stage 23, strict temperature control is necessary in order to maintain the specified conditions in viscosity For instance, in the case of PSK50 (a trade name for a product of SUMITA Optical Glass, Inc.), the temperature is controlled at 540° C. at the injection nozzle position and at 420° C. for the mold assembly unit 1 in the injection stage 21. The temperature is set at 390° C. and 340° C. in the pressing and slow cooling stages 22 and 23, respectively. In the case of CD45 (a trade name for a product of SUMITA Optical Glass, inc.), the temperatures for the injection nozzle and molding assembly unit 1 are maintained at 680° C. and 560° C. in the injection stage 21, respectively, while controlling the temperature of the pressing stage 22 at 510° C. and the temperature of the slow cooling stage 23 at 430° C.

Figure 8:
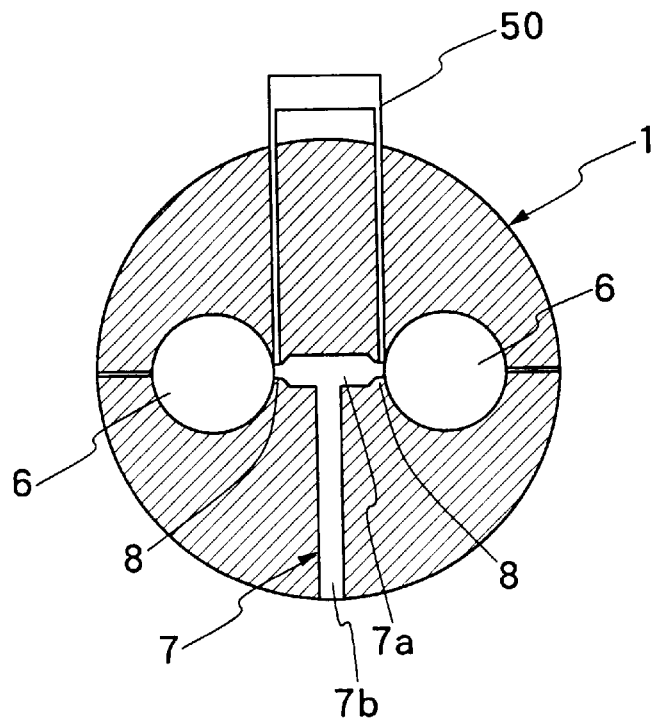
FIG. 8 is a schematic sectional view of a modified mold assembly unit.

In the pressing stage 22, the sprue 7 has to be sealed off in order to prevent molten glass from spilling out from mold cavities upon application of a load on the upper mold members. In this regard, instead of rapidly cooling molten glass in the sprue 7 for sealing purposes as described hereinbefore, a gate cutter member 50 of U-shape may be slidably fitted into the mold assembly unit 1 as shown particularly in FIG. 8. The gate cutter member 50, which is initially held in an outer receded position, is slidable into an inner gate closing position to block the gates 8 of the mold cavities. More particularly, the gate cutter member 50 is held in the outer receded position away from the gates 8 at the time of glass injection, and, upon completion of glass injection, advanced into the gate blocking position to close the gates 8. In this case, the gate cutter member 50 functions both as a closure means for closing the gates to the mold cavities 6 and at the same time as a gate-cutter means for separating the surplus glass in the sprue 7 from the molded optical elements upon ejection from the molds 1. It follows that, in this case, there is no need for separating the surplus glass by a gate cutting operation in a later stage.

Figure 9:
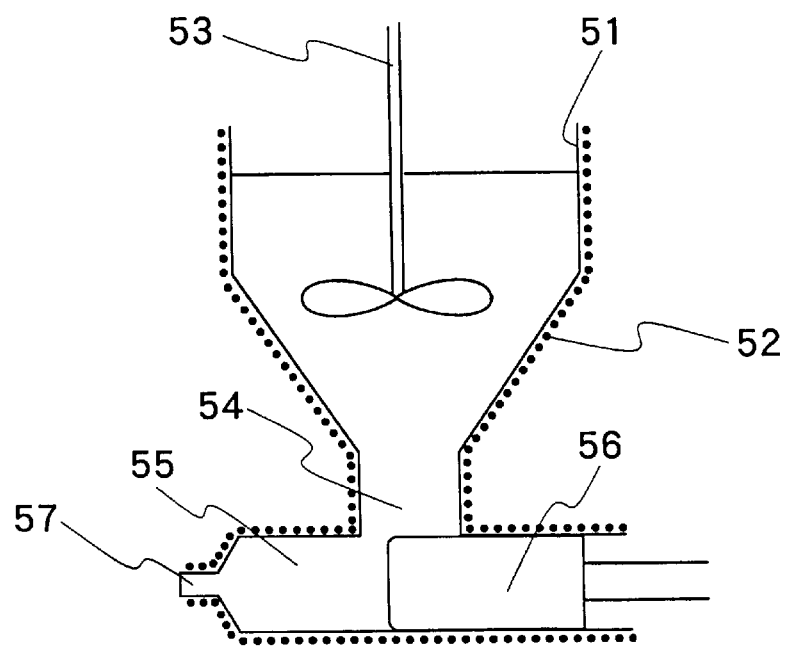
FIG. 9 is a schematic illustration of another example of the glass injection means, using a crucible.

As for means for injecting molten glass into the molds, a glass injection device as shown in FIG. 9 may be employed in place of the above-described injection cartridge 30. As seen in that figure, glass material to be fed to the molds is maintained at a temperature of glass working point within a crucible 51 with a heater 52. A stirrer 53 is provided in the crucible 51 to make glass temperatures in the crucible 51 uniform. Through a downflow passage 54, the crucible 51 is connected to a cylinder 55 with an injection nozzle 57 at the fore end thereof. A piston 56 is fitted in the cylinder 55 thereby to push molten glass in the cylinder 55 toward the injection nozzle 57 under a predetermined pressure.

The injection cartridge 30 has advantages over the crucible 51 in that it is compact in construction and can be used in such a way as to inject molten glass simultaneously into a plural number of molds 1. More specifically, arrangements may be made to transfer a plural number of mold units 1 to and from an injection stage 22 by the use of a suitable mold transfer means, while providing a corresponding number of injection cartridge 30 to inject molten glass simultaneously into the plural number of mold units 1. The throughput of the molding process can be enhanced considerably by the provision of a multi-injection stage.

In this connection, arrangements may also be made to inject glass material of different compositions into a plural number of mold units 1 The glass working temperature, which may vary depending upon the glass composition, can be set separately and independently for each one of the glass rods in the respective injection cartridges 30. However, aside from differences in working temperature, it is desirable to choose glass compositions with similar temperatures at yielding and strain points since the mold temperatures in the injection stage 21 as well as internal temperatures in the pressing stage 22 and slow cooling stage 23 are equally applied to the respective glass compositions. Especially, the temperature should be controlled strictly in the pressing stage 22 which is in the role of correcting and removing shrink marks and appropriating surface contours. The glass viscosity is maintained in the range $10^{10}$ to $10^{12}$ in the pressing stage, so that there is a difference in temperature of about 40° C. over the viscosity range. Accordingly, in case two kinds of glass materials are to be fed concurrently, one glass should preferably have a difference smaller than ±20° C. preferably a difference smaller than ±10° C. from the other glass in temperature at yielding point.

For example, VCD20 (a trade name for a product of Hoya Corporation) or M-FD6 (a trade name for a product of the same manufacturer) can be used concurrently with the aforementioned glass material CD45. In case of a combination of VCD20 and CD45, it will be suitable to control the temperature at 560° C. for the mold assembly unit 1 in the injection stage 21, at 520° C. in the pressing stage 22, and at 430° C. in the slow cooling stage 23. On the other hand, in case of a combination of M-FD6 and CD45, it will be suitable to control the temperature at 560° C. for the mold assembly unit 1 in the injection stage 21, at 510° C. in the pressing stage 22, and at 420° C. in the slow cooling stage 23. The injection molding temperature is suitably 710° C. for VCD20 and 700° C. for M-DF6.

Thus, high precision optical elements can be produced efficiently by employing the mold assembly unit 1 in the above-described manner in injection molding of glass material. If desired, however, instead of the mold set 1 of FIGS. 1 through 4, a mold assembly unit as shown at 60 in FIG. 10 or a mold assembly unit as shown at 70 in FIG. 11 may be employed in the injection molding.

Figure 10:
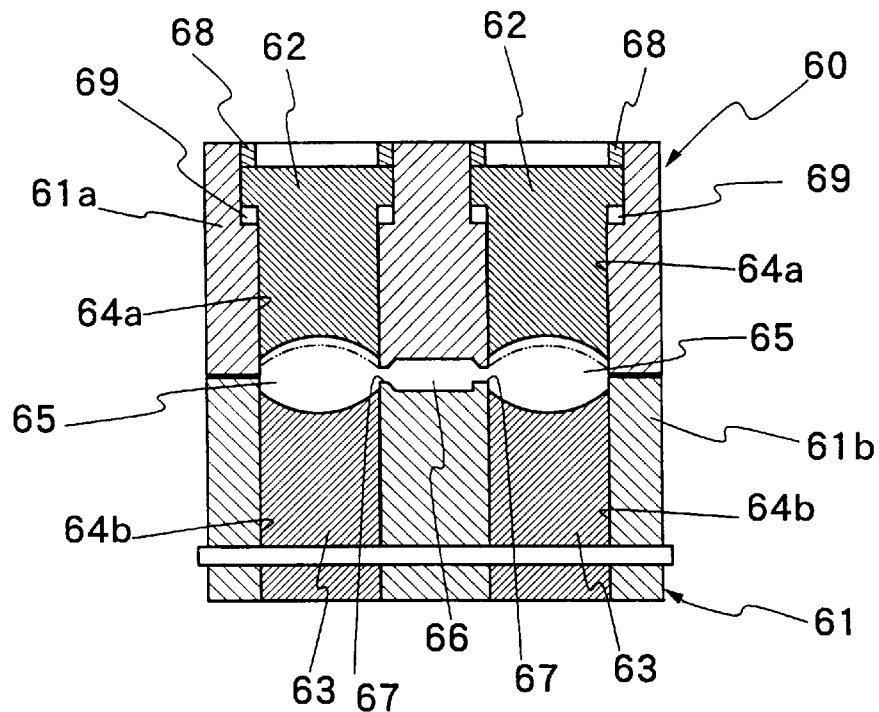
FIG. 10 is a schematic vertical section of another modification of the mold assembly unit suitable for use in the glass injection molding according to the invention.

More specifically, shown in FIG. 10 is a mold assembly unit 60 which is substantially same as the above-described mold assembly unit 1 except for elimination of the spring 12. Namely, in this case, the mold assembly unit 60 is comprised of a shell block 61 and a couple of molds each having upper and lower mold members 62 and 63. The shell block 61 is constituted by upper and lower shell members 61a and 61b which are provided with vertical shafts 64a and 64b to set the upper and lower mold members 62 and 63 therein. The upper and lower mold members 62 and 63 define therebetween cavities 65, in communication with a sprue 66 and gates 67 which are formed on the part of the shell block 61.

Each lower mold member 63 is fixed in the shaft 64b of the lower shell member 61b, while each upper mold member 62 is vertically movable in a limited range within the shaft 64a of the upper shell member 61a. In order to delimit the vertical movable range of the upper mold member 62, each shaft 64a in the upper shell member 61a is broadened to have a large-diameter portion over a predetermined distance from its top ends slidably receiving therein a flange portion at the upper or outer end of the upper mold member 62 for movement between a stepped wall portion of the broadened large-diameter portion and a stopper ring 68 which is threaded into the upper or outer end of the shaft 64a. A cavity, which corresponds in shape to an optical element to be produced, is defined in the mold when the flange portion of the upper mold member 62 is abutted against the stopper ring 68 as indicated by a solid line in FIG. 10. Normally, the upper mold member 62 is allowed to sink into a lower or inner position by gravity until it is abutted against the stepped stopper wall 69 as indicated by an imaginary line in the same figure. When in the lower or inner position just mentioned, the inner end of the upper mold member 62 should not block the gate 67 which is provided on the part of the shell block 61.

When put in use for injection molding of optical elements, the mold assembly unit 60 is firstly transferred to the injection stage, with the upper mold members 62 in the respective lower positions. Upon introduction of molten glass in the injection stage, each upper mold member 62 is pushed upward by the pressure of introduced molten glass until it is abutted against the stopper ring 68 and into a position where a predetermined cavity 65 is defined between the upper and lower mold members 62 and 63. In this case, the weight of the upper mold member 62 itself is imposed as a pressing load on the molten glass in the mold cavity 65, so that there is no need for applying an additional weight or for providing other pressing means in the pressing stage.

Figure 11:
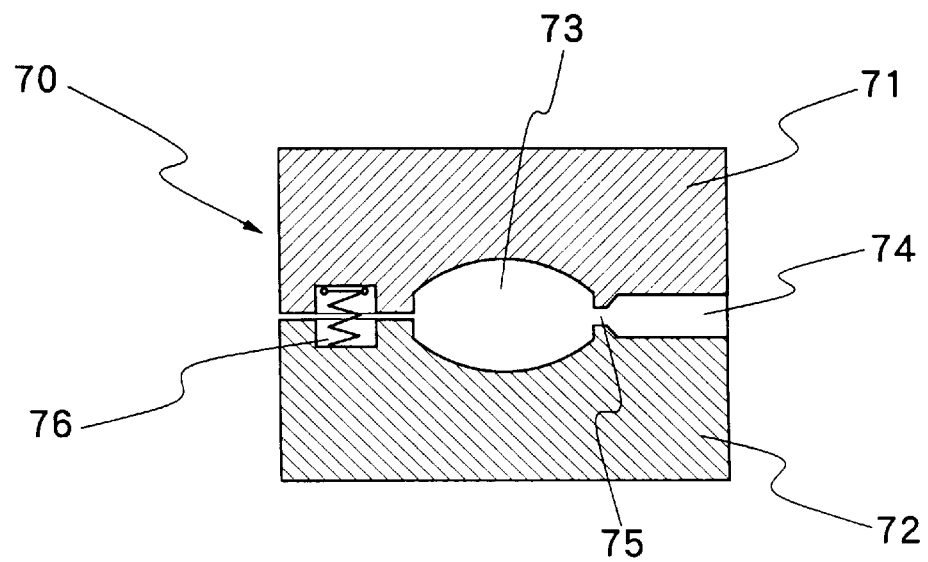
FIG. 11 is a schematic vertical section of still another modification of the mold assembly unit for use in the injection molding according to the invention.

Shown in FIG. 11 is a mold assembly unit 70 which is largely constituted by an upper mold member 71 and a lower mold member 72 which define a cavity 73 therebetween. The cavity 73 is connected to sprue 74 and gate 75. Normally, the upper and lower mold members 71 and 72 are disposed out of contact with each other, that is to say, a gap space is formed between the assembled upper and lower mold members 71 and 72 by an interposed biasing means 76 like biasing spring. The width of the gap space between the upper and lower mold members 71 and 72 is controlled, for example, by the use of a mold clamp means or the like for leaving a gap space of a predetermined width as a gassing passage in the injection stage. In order to discharge gases in the mold cavity 73 while blocking intrusion of molten glass, the gassing passage is maintained in a width ranging from several $\mu$m to several tens $\mu$m depending upon the viscosity of molten glass.

At a glass injecting station, molten glass is introduced smoothly and securely into every part of the cavity 73 of the mold assembly unit 70 which can discharge gases through the gap space opened between the upper and lower mold members 71 and 72. At a pressing station, the upper mold member 71 is pressed toward the lower mold member 72 against the action of the biasing means 76. In this case, it is desirable to employ a mold clamp means which can be applied in two different positions, ie., a first position for maintaining a gassing gap space between the upper and lower mold members 71 and 72 while the mold assembly unit 70 in the injecting station and a second position for pressing the upper mold member 72 against the lower mold member 72 when the mold assembly unit 70 is in the pressing station. Of course, the mold pressing means can be dispensed with in case a mold calmp means is arranged to press the upper mold members in this manner.

What is claimed is:

1. A method for-producing vitreous optical elements by injection molding, comprising:

a melting stage for melting down a glass material into molten state in a viscosity at a working point or lower than a viscosity at a working point of said glass material;

an injection stage for injecting molten glass through a sprue into a mold cavity of a split mold assembly having upper and lower mold members in a closed position; and a pressing stage for applying a predetermined pressure on the glass material in said mold cavity by further moving one of said mold members toward the other mold member from said closed position in a cooling stage following said injection stage at a time point w hen glass material in said sprue has solidified and while said mold assembly is being cooled down to a temperature in the vicinity of a yield point of said glass material.

2. A method for producing vitreous optical elements by injection molding as defined in claim 1, wherein said glass material is injected in a molten state with a viscosity in the range of $10^2$ to $10^3$ poise in said injecting stage, and applied with a pressure while in a viscosity in the range of $10^{10}$ to $10^{12}$ poise in said pressing stage.

3. A method for producing vitreous optical elements by injection molding as defined in claim 1, wherein said glass material is applied with a load of from 100 gf/cm$^2$ to 150 kgf/cm$^2$ in said pressing stage.

4. A method for producing vitreous optical elements by injection molding as defined in claim 1, wherein, subsequent to said pressing stage, said glass material is subjected to slow cooling to a viscosity in the range of from $10^{14}$ to $10^{18}$, higher than a strain point of said glass material.

* * * * *